(12) United States Patent
Fuke (10) Patent No.: US 9,036,226 B2
(45) Date of Patent: May 19, 2015

(54) READING DEVICE AND IMAGE FORMING APPARATUS

(71) Applicant: KYOCERA Document Solutions Inc., Osaka (JP)

(72) Inventor: Hikaru Fuke, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/470,637

(22) Filed: Aug. 27, 2014

(65) Prior Publication Data

US 2015/0062671 A1  Mar. 5, 2015

(30) Foreign Application Priority Data

Aug. 29, 2013 (JP) .................................. 2013-178672

(51) Int. Cl.
*H04N 1/04* (2006.01)
*H04N 1/12* (2006.01)
*H04N 1/00* (2006.01)

(52) U.S. Cl.
CPC ............. *H04N 1/123* (2013.01); *H04N 1/0057* (2013.01)

(58) Field of Classification Search
USPC ................................. 358/498, 497, 496, 474
See application file for complete search history.

(56) References Cited

U.S. PATENT DOCUMENTS

| | | | |
|---|---|---|---|
| 6,424,435 B1* | 7/2002 | Kao | 358/497 |
| 6,888,651 B2* | 5/2005 | Lee | 358/497 |
| 7,158,270 B2* | 1/2007 | Sheng et al. | 358/497 |
| 7,768,679 B2 | 8/2010 | Yamaguchi | |
| 2007/0195139 A1 | 8/2007 | Yamaguchi | |

FOREIGN PATENT DOCUMENTS

| | | |
|---|---|---|
| JP | 4572841 B2 | 11/2001 |
| JP | 2004-020979 A | 1/2004 |
| JP | 2007-223067 A | 9/2007 |

* cited by examiner

*Primary Examiner* — Houshang Safaipour
(74) *Attorney, Agent, or Firm* — Knobbe, Martens Olson & Bear LLP (57) ABSTRACT

A reading device includes an original glass plate, a scanner, a support portion, a towing portion, a guide portion, and an engagement portion. The towing portion is configured to tow and move the support portion in a predetermined direction. The guide portion is configured to guide a direction of movement of the support portion and the scanner caused by the towing of the towing portion. A center of mass of the scanner and the support portion is positioned at a midpoint between contact portions provided at both ends of the scanner and coming into contact with the original glass plate. The guide portion is disposed under the center of mass of the scanner and support portion. The towing portion is secured to the support portion or the engagement portion at a point on a vertical line passing through the center of mass of the scanner and support portion.

5 Claims, 12 Drawing Sheets

READING DEVICE AND IMAGE FORMING APPARATUS

INCORPORATION BY REFERENCE

This application claims priority to Japanese Patent Application No. 2013-178672 filed on Aug. 29, 2013, the entire contents of which are incorporated by reference herein.

BACKGROUND

The present disclosure relates to reading devices and image forming apparatuses and particularly relates to a mechanism for moving a scanner toward reading an image of an original document.

Image forming apparatuses having a copy function and/or a scan function are provided with a reading device configured to read an image of an original document. In many of reading devices, for example, a CIS scanner is adopted. The CIS scanner is configured to read an image of an original document placed on an original glass plate by reciprocating in a direction of reading of the original document while keeping contact with the original glass plate. As a transport device for reciprocating the scanner, a mechanism is employed in which a carriage (support portion) carries the scanner, the carriage is towed by a towing portion, such as a belt or a wire, and a guide member (guide portion) provided under the carriage makes contact with a projection located at the bottom of the carriage to guide the direction of travel of the carriage.

SUMMARY

A technique improved over the aforementioned technique is proposed herein as one aspect of the present disclosure.

A reading device according to an aspect of the present disclosure includes an original glass plate, a scanner, a support portion, a towing portion, a guide portion, and an engagement portion.

The original glass plate is configured so that an original document to be read is placed thereon.

The scanner is provided at both ends in a longitudinal direction thereof with contact portions in contact with the original glass plate and configured to read an image of the original document placed on the original glass plate.

The support portion supports the scanner.

The towing portion is configured to tow and move the support portion in a predetermined direction.

The guide portion extends in the predetermined direction and is configured to guide a direction of movement of the support portion and the scanner caused by the towing of the towing portion.

The engagement portion is provided on a portion of the support portion facing the guide portion to project toward the guide portion, engages with the guide portion, and allows the support portion and the scanner to be moved along the guide portion by the towing of the towing portion.

In the reading device, a center of mass of the scanner and the support portion is positioned at a midpoint between the contact portions provided at both the ends of the scanner.

The guide portion is disposed under the center of mass.

The towing portion is secured to the support portion or the engagement portion at a point on a vertical line passing through the center of mass.

An image forming apparatus according to another aspect of the present disclosure includes the aforementioned reading device and an image forming section configured to form an image on a recording medium based on the image read by the reading device.

DETAILED DESCRIPTION

Figure 1:
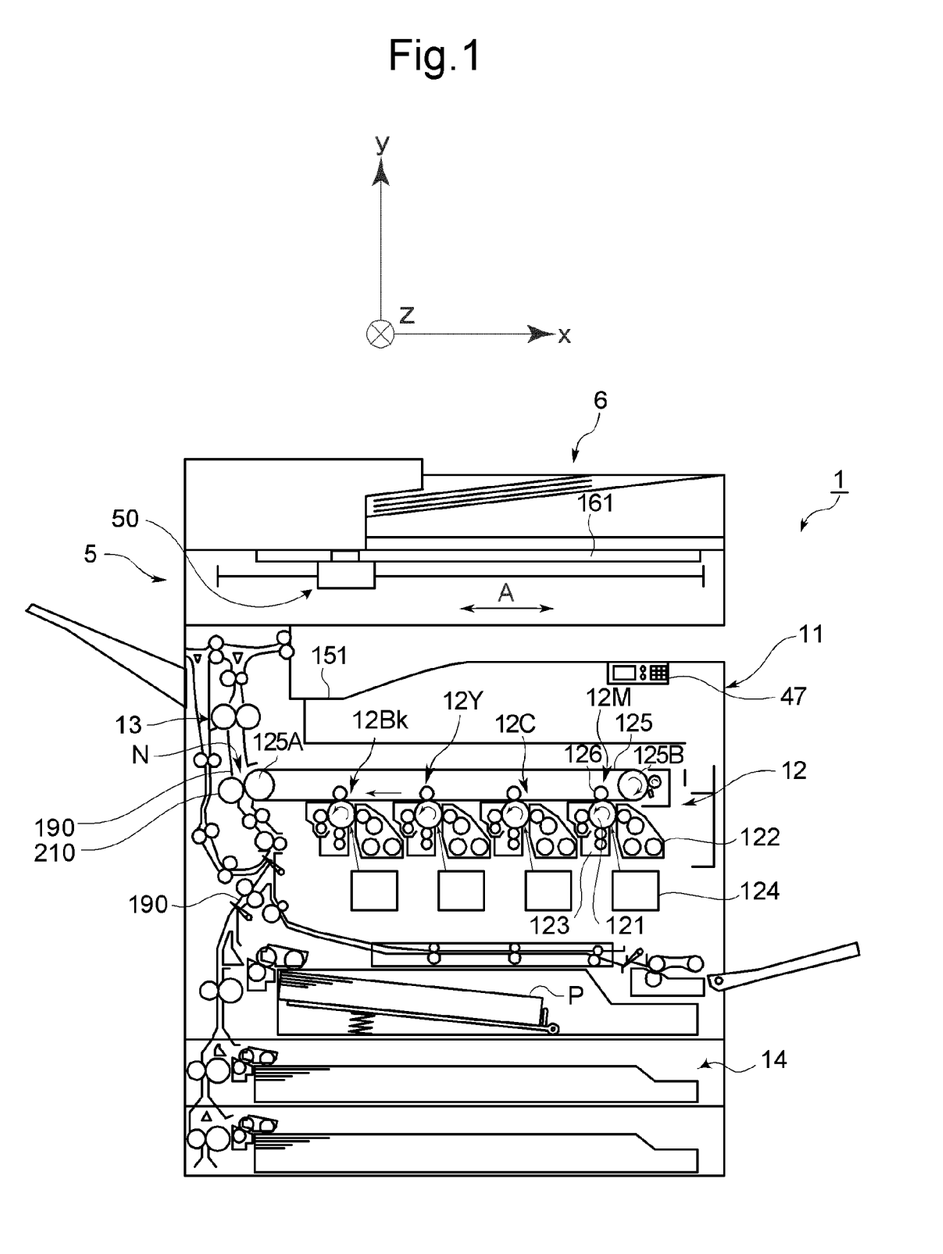
FIG. 1 is a front cross-sectional view showing the structure of an image forming apparatus according to one embodiment of the present disclosure.

Hereinafter, a description will be given of a reading device and an image forming apparatus according to one embodiment of the present disclosure with reference to the drawings. FIG. 1 is a front cross-sectional view showing the structure of an image forming apparatus according to one embodiment of the present disclosure.

An image forming apparatus 1 according to one embodiment of the present disclosure is a multifunction peripheral having multiple functions including, for example, a copy function, a print function, a scan function, and a facsimile function. The image forming apparatus 1 is made up so that an apparatus body 11 thereof includes an operating section 47, an image forming section 12, a fixing section 13, a paper feed section 14, a document feed section 6, a reading device 5, and so on.

In a document reading operation of the image forming apparatus 1, the reading device 5 optically reads an image of an original document being fed from the document feed section 6 or an image of an original document placed on an original glass plate 161 to generate image data. The image data generated by the reading device 5 is stored on an internal HDD, a network-connected computer or the like. In this embodiment, a scanner 50 included in the reading device 5 is a CIS scanner. The scanner 50 has a shape extending in a depth direction (direction z) of FIG. 1. The depth direction of the scanner 50 is its longitudinal direction and both ends of the scanner 50 in the longitudinal direction are in contact with the original glass plate 161. In this state, the scanner 50 can reciprocate in the direction of the arrow A shown in FIG. 1 to read an image of an original document placed on the original glass plate 161.

In an image forming operation of the image forming apparatus 1, the image forming section 12 forms a toner image on a recording paper sheet P serving as a recording medium fed from the paper feed section 14, based on image data generated by the document reading operation, image data stored on the internal HDD or like image data. Each of image forming units 12M, 12C, 12Y, and 12Bk of the image forming section 12 includes a photosensitive drum 121, a charging device 123, an exposure device 124, a developing device 122, and a primary transfer roller 126.

The developing device 122 of each of the image forming units 12M, 12C, 12Y, and 12Bk contains toner for developing an electrostatic latent image. The developing device 122 is configured to supply toner to the surface of the associated photosensitive drum 121 where charging of the charging device 123 and exposure of the exposure device 124 have been completed.

In the case of multicolor printing, the image forming unit 12M for magenta, the image forming unit 12C for cyan, the image forming unit 12Y for yellow, and the image forming unit 12Bk for black of the image forming section 12 form respective toner images on their respective photosensitive drums 121 through charging, exposure, and developing processes based on respective images of respective different color components constituting the above image data and then allow their respective primary transfer rollers 126 to transfer the toner images to an intermediate transfer belt (transfer belt) 125 mounted over a drive roller 125A and a driven roller 125B.

The intermediate transfer belt 125, the primary transfer rollers 126, the drive roller 125A, and the driven roller 125B are incorporated in an intermediate transfer unit.

The outer peripheral surface of the intermediate transfer belt 125 is set to an image carrying surface to which toner images are to be transferred. The intermediate transfer belt 125 is driven by the drive roller 125A while engaging against the peripheral surfaces of the photosensitive drums 121. The intermediate transfer belt 125 endlessly travels between the drive roller 125A and the driven roller 125B while synchronizing with the rotation of each photosensitive drum 121.

The toner images of different colors transferred to the intermediate transfer belt 125 are superposed each other on the intermediate transfer belt 125 by controlling their transfer timings, resulting in a multicolor toner image. A secondary transfer roller 210 transfers the multicolor toner image formed on the outer peripheral surface of the intermediate transfer belt 125, at a nip N between the secondary transfer roller 210 and the drive roller 125A with the intermediate transfer belt 125 in between, to a recording paper sheet P conveyed from the paper feed section 14 along a conveyance path 190. Thereafter, the fixing section 131 fixes the toner image on the recording paper sheet P by the application of heat and pressure. The recording paper sheet P having a multicolor image fixed thereon by the completion of the fixing treatment is discharged to a paper output tray 151.

Figure 2:
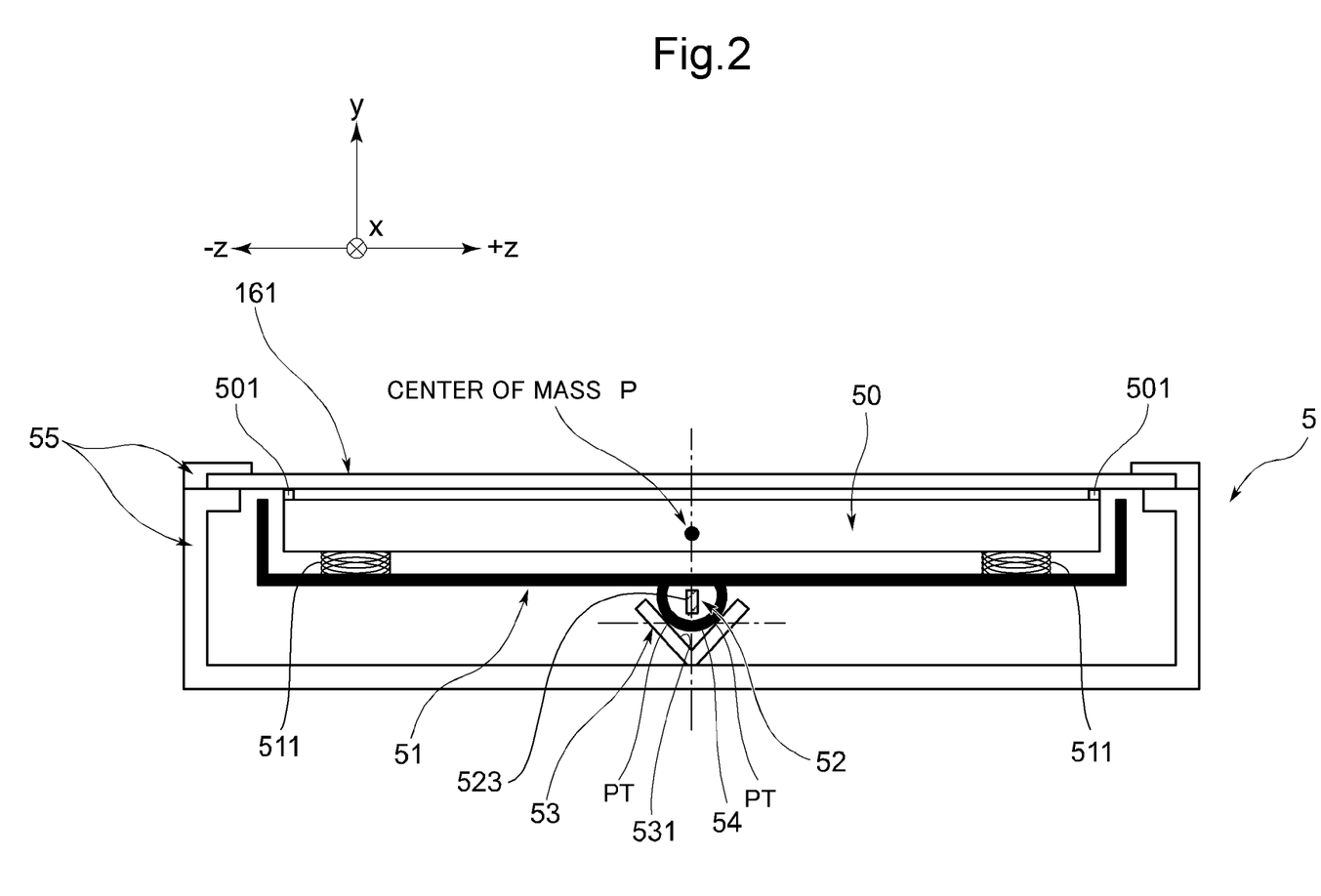
FIG. 2 is a side view showing a schematic structure of a reading device.
Figure 3:
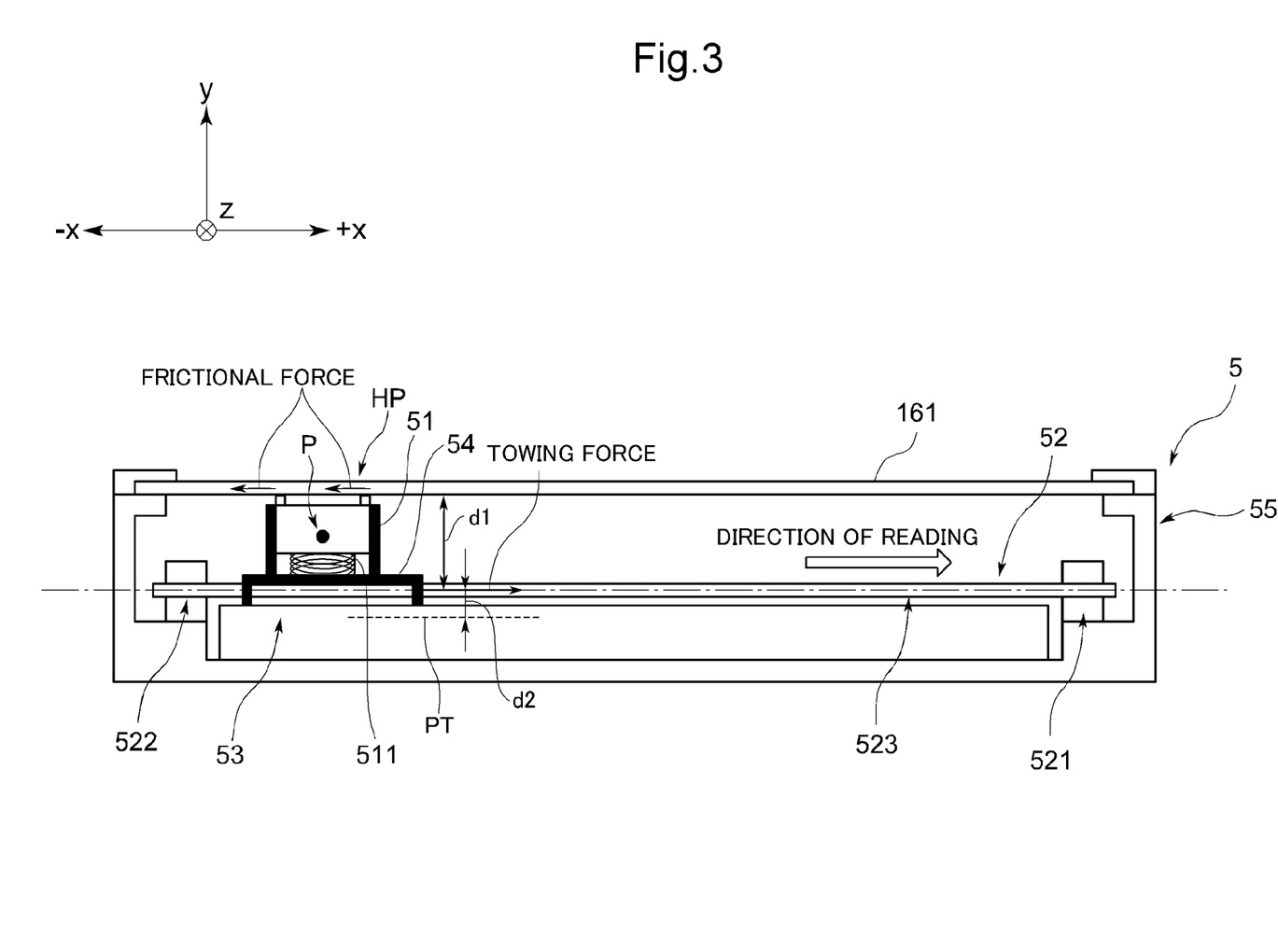
FIG. 3 is a side view showing the schematic structure of the reading device as viewed from a different direction from in FIG. 2.

Next, a description will be given of the structure of the reading device 5. FIG. 2 is a side view showing a schematic structure of the reading device 5. FIG. 3 is a side view showing the schematic structure of the reading device 5 as viewed from a different direction from in FIG. 2.

The reading device 5 includes the scanner 50, a support portion 51, a towing portion 52, a guide portion 53, an engagement portion 54, and the original glass plate 161. The scanner 50, the support portion 51, the towing portion 52, the guide portion 53, and the engagement portion 54 are covered by a frame 55 having a top opening. The original glass plate 161 is fitted into the top opening of the frame 55 and thus forms the top of the reading device 5.

The scanner 50 is, as described previously, of CIS type and has an elongate shape extending in the direction z of FIGS. 2 and 3.

The support portion 51 supports the scanner 50 with the scanner 50 carried thereon. In this embodiment, the scanner 50 is mounted onto the support portion 51 through biasing springs 511. Thus, the scanner 50 on the support portion 51 is urged in the direction y of FIGS. 2 and 3.

In the above manner, the scanner 50 mounted on the support portion 51 is configured to make contact with the under surface of the original glass plate 161 facing the apparatus interior by a biasing force of the biasing springs 511. The scanner 50 is provided at both ends in the longitudinal direction with contact portions 501 facing and projecting toward the original glass plate 161. The scanner 50 makes contact at its contact portions 501 with the original glass plate 161.

The towing portion 52 is a mechanism configured to tow and move the support portion 51 in a predetermined direction. The predetermined direction is a direction along the original glass plate 161 and the original document placed thereon and, in this embodiment, is the direction +x and direction −x (the direction of the x-axis) shown in FIGS. 2 and 3.

The guide portion 53 is a guide rail extending linearly in the direction of the x-axis, which is the predetermined direction, and configured to guide the direction of movement of the support portion 51 and the scanner 50 caused by the towing of the towing portion 52. The engagement portion 54 is provided at a portion of the support portion 51 facing the guide portion 53 to project toward the guide portion 53.

The guide portion 53, as shown in FIG. 2, has an approximately V-shape as viewed from laterally in the direction of the x-axis and includes a recess 531 into which the engagement portion 54 can be fitted.

A belt 523 of the towing portion 52 is secured to the engagement portion 54. By the securement of the belt 523 to the engagement portion 54, the support portion 51 and the scanner 50 carried thereon can move, together with the belt 523, with the travel of the belt 523. The material used as the belt 523 is one hard to stretch by the towing, such as a fiber-reinforced resin belt or a metal wire.

Figure 4:
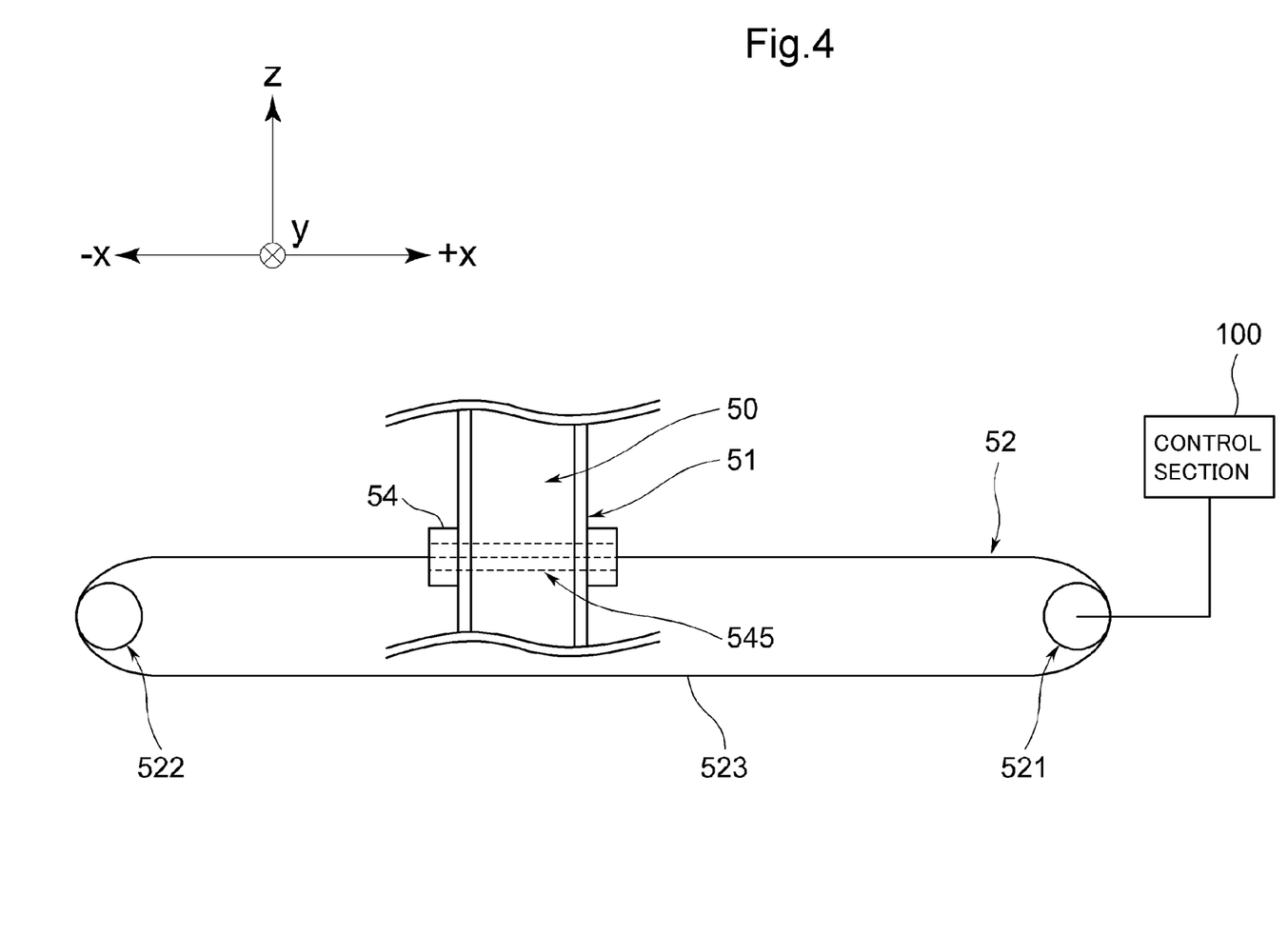
FIG. 4 is a plan view showing the structure of part of the reading device consisting of a scanner, a support portion, and a towing portion.
Figure 5:
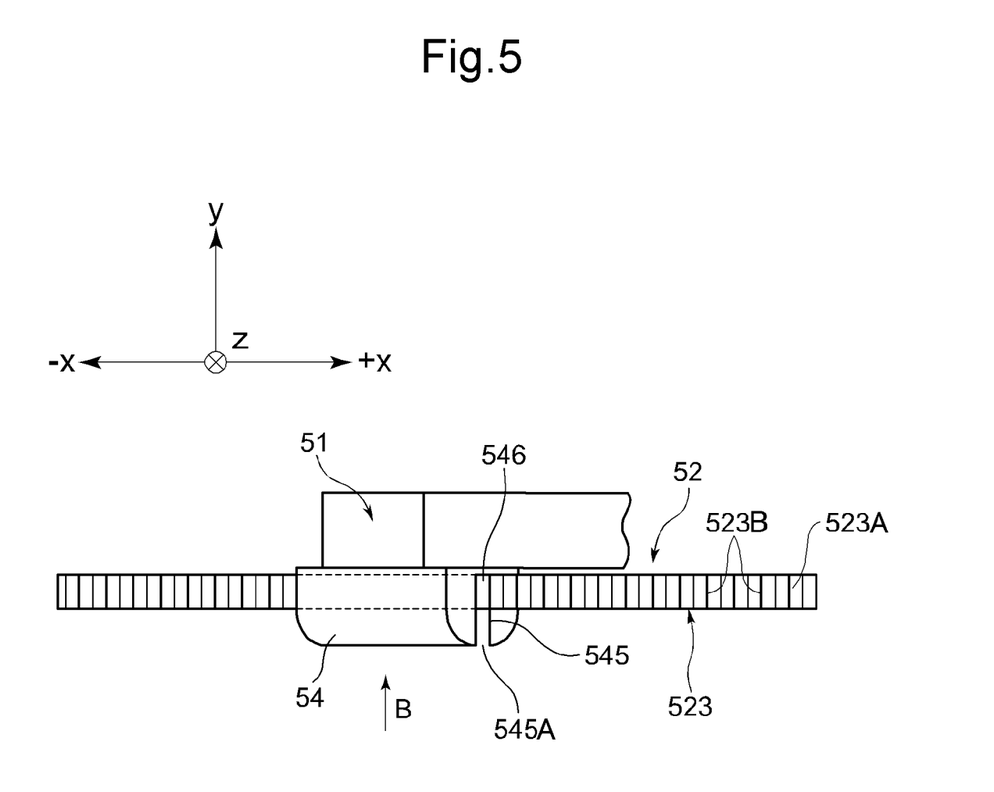
FIG. 5 is a perspective view showing a portion of a belt secured to an engagement portion.
Figure 6:
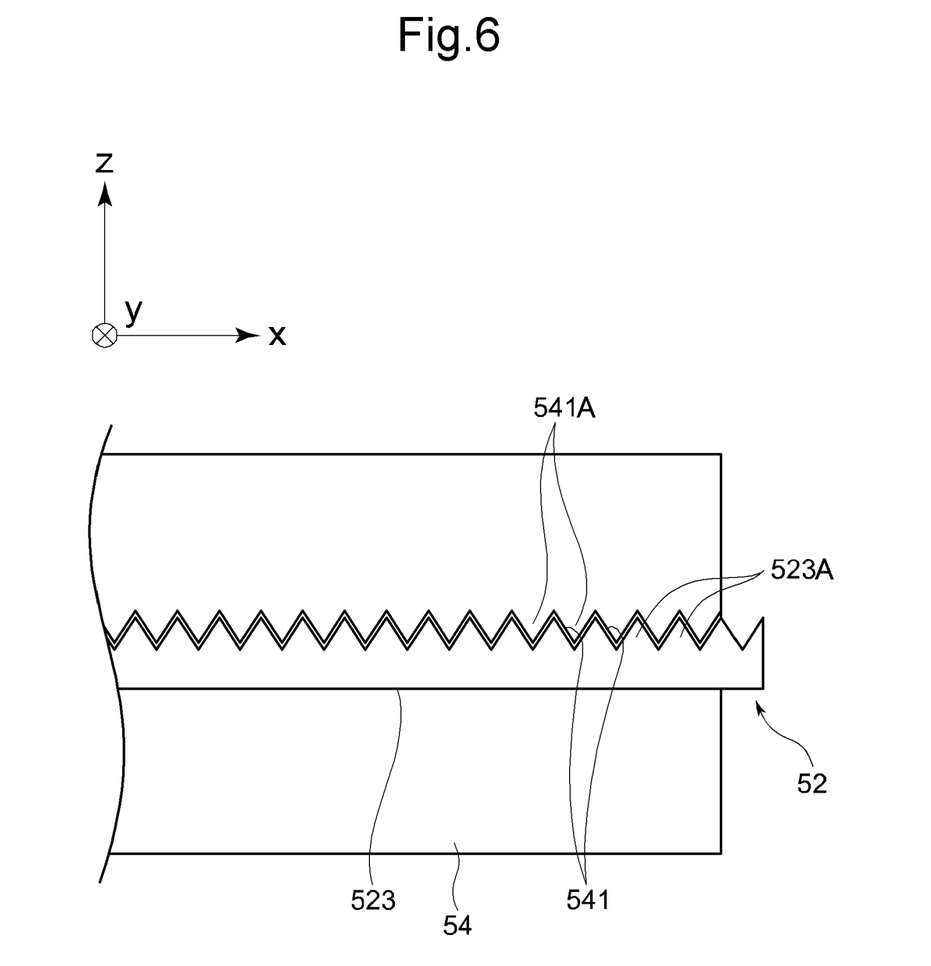
FIG. 6 is a plan view showing the portion of the belt secured to the engagement portion as viewed from the direction of the arrow B in FIG. 5.

The structures of the towing portion 52 and the engagement portion 54 will be described with reference to, in addition to FIGS. 2 and 3, FIGS. 4 to 6. FIG. 4 is a plan view showing the structure of part of the reading device 5 consisting of the scanner 50, support portion 51, and towing portion 52. FIG. 5 is a perspective view showing a portion of the belt 523 secured to the engagement portion 54. FIG. 6 is a plan view showing the portion of the belt 523 secured to the engagement portion 54 as viewed from the direction of the arrow B in FIG. 5.

The towing portion 52 includes a drive section 521, a pulley 522, and the belt 523. The drive section 521 is composed of a drive source, such as an unshown motor, and a rotary roller rotatable by a rotational drive force supplied from the drive source. FIGS. 2 and 3 show only the rotary roller of the drive section 521. The belt 523 is mounted over the rotary roller of the drive section 521 and the pulley 522 to endlessly travel with the rotational drive of the rotary roller. The pulley 522 can be driven into rotation by the travel of the belt 523.

The belt 523 has an annular continuous shape. The belt 523, as shown in FIGS. 5 and 6, has a plurality of projections 523B formed on a lateral surface 523A. The projections 523B have a serrate shape (approximately inverted V-shape) projecting in the direction z. In the engagement portion 54 to which the belt 523 is to be secured, a through slit 545 is formed which allows the belt 523 to pass therethrough. A lateral surface 541 of this through slit 545 in contact with the belt 523 has a convexo-concave portion 541A formed thereon in a shape mating with the projections 523B. The belt 523 is inserted through an opening 545A of the through slit 545 of the engagement portion 54 into the through slit 545 to mate the convexo-concave portion 541A with the projections 523B inside the through slit 545. By the mating of the convexo-concave portion 541A with the projections 523B, the engagement portion 54 and the belt 523 are joined together.

Under this structure, a control section 100 configured to control the operation of the reading device 5 drives the drive source of the drive section 521 to rotate the belt 523 to travel it in the direction +x during the operation for reading an image of an original document. Specifically, for example, the support portion 51 and the scanner 50 have, as shown in FIG. 3, a home position HP located at an end point of the reading device 5 in the direction of the x-axis and move in the direction +x from the home position HP. The guide portion 53 extends linearly in the direction x and the engagement portion 54 located under the support portion 51 is received by the recess 531 of the guide portion 53. Therefore, by the movement of the support portion 51 and the scanner 50 in the direction x, the engagement portion 54 moves along the guide portion 53 while sliding on the inside surface of the recess 531 of the guide portion 53. Thus, the direction of movement of the support portion 51 and the scanner 50 is guided in the direction of extension of the guide portion 53.

When the support portion 51 and the scanner 50 move to the other end point of the reading device 5 in the direction of the x-axis, which is opposite to the home position HP, resulting in the completion of the current reading operation, the control section 100 reversely drives the drive source to travel the belt 523 in the direction −x. Thus, the support portion 51 and the scanner 50 move in the direction −x. At the point of time when the support portion 51 and the scanner 50 move to the home position HP, the control section 100 deactivates the drive source to stop the travel of the belt 523.

In this manner, the scanner 50 can be reciprocated during the reading of an image of an original document. The scanner 50 reciprocates as its contact portions 501, 501 are kept contact with the original glass plate 161.

Figure 7:
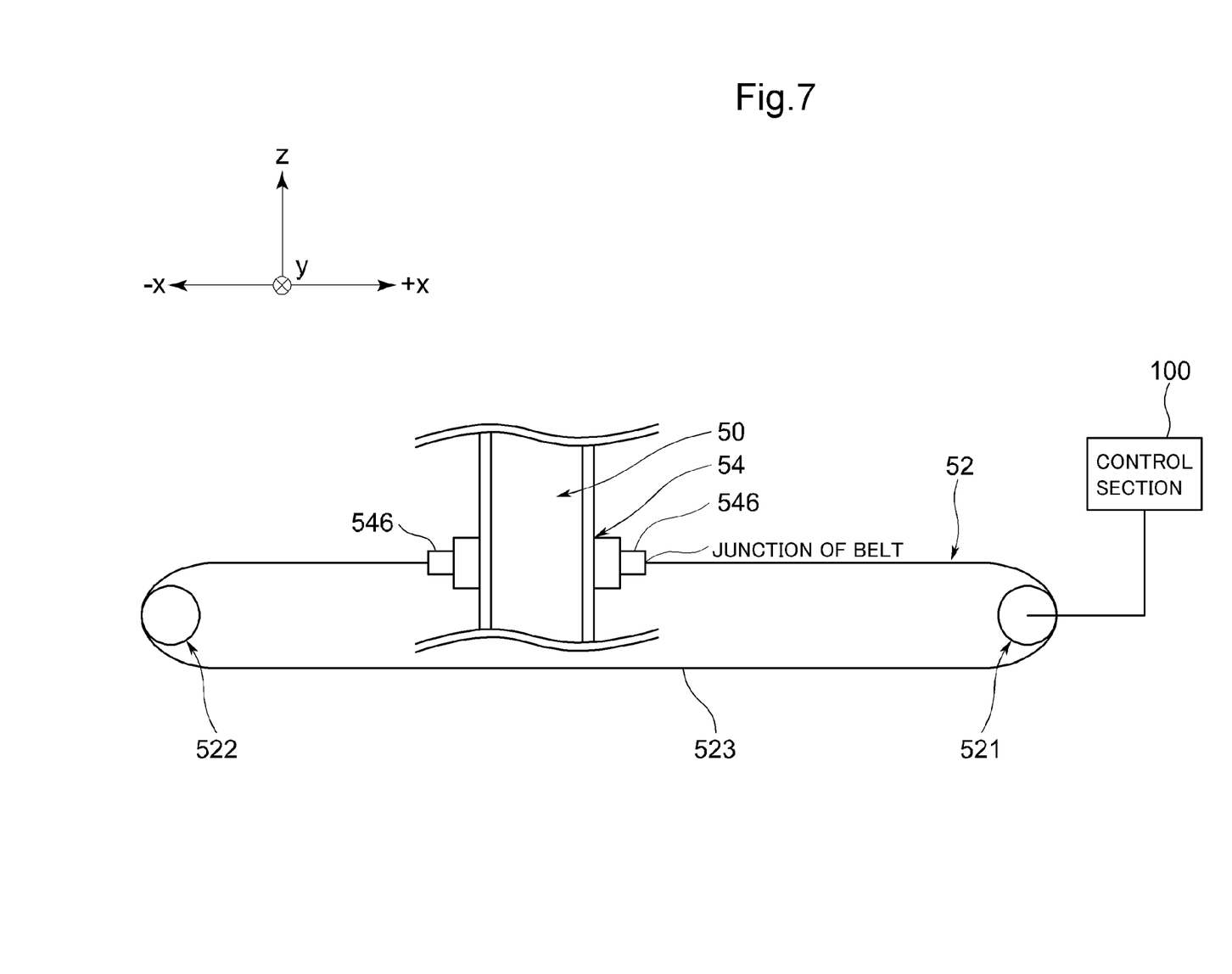
FIG. 7 is a plan view showing part of the reading device consisting of the scanner, support portion, and towing portion, wherein the reading device has a structure of securement of the towing portion to the engagement portion according to another embodiment.
Figure 8:
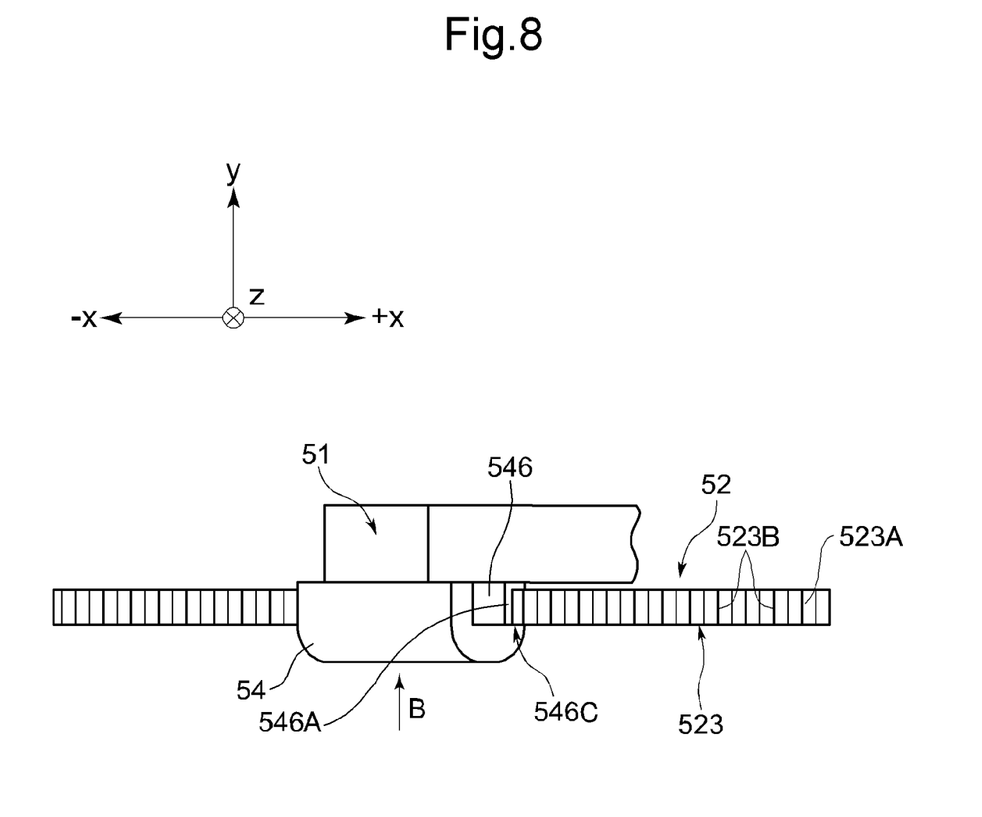
FIG. 8 is a perspective view showing a portion of the belt secured to the engagement portion according to the other embodiment.
Figure 9:
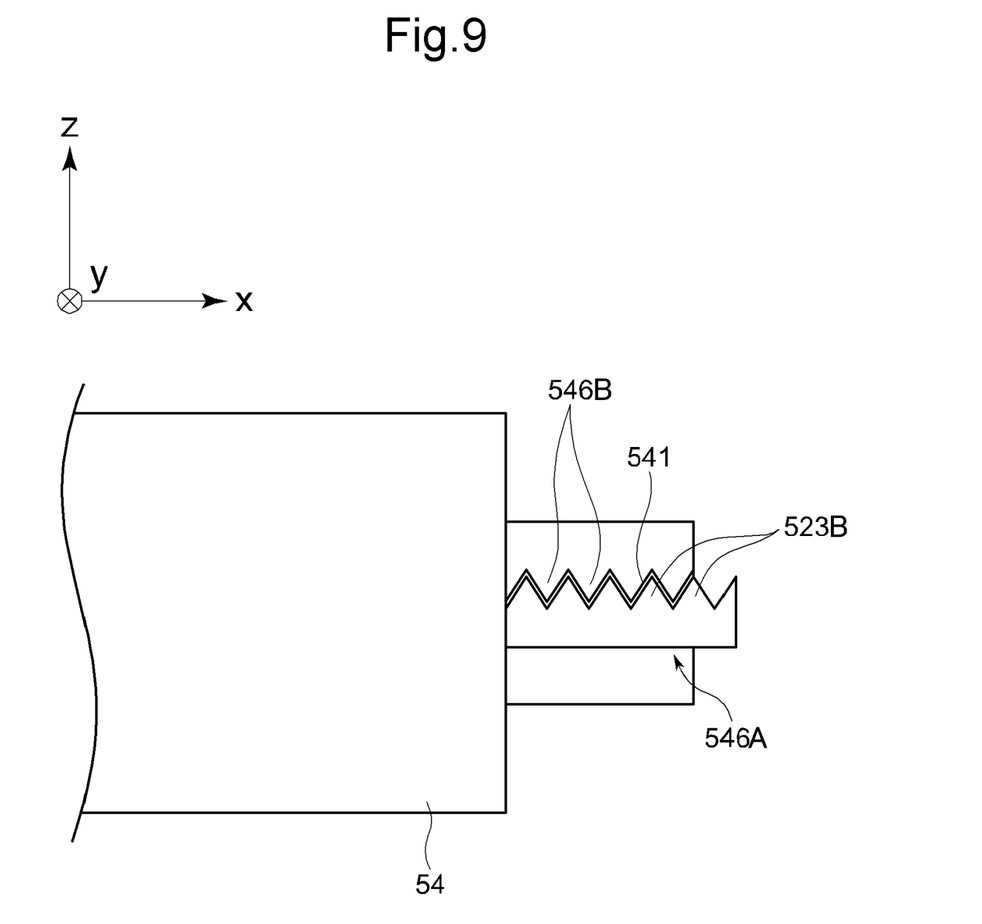
FIG. 9 is a plan view showing the portion of the belt secured to the engagement portion according to the other embodiment as viewed from the direction of the arrow B in FIG. 8.

Next, a description will be given of another embodiment of securement of the towing portion 52 to the engagement portion 54. FIG. 7 is a plan view showing part of the reading device 5 consisting of the scanner 50, support portion 51, and towing portion 52, wherein the reading device 5 has a structure of securement of the towing portion 52 to the engagement portion 54 according to the other embodiment. FIG. 8 is a perspective view showing a portion of the belt 523 secured to the engagement portion 54 according to the other embodiment. FIG. 9 is a plan view showing the portion of the belt 523 secured to the engagement portion 54 according to the other embodiment as viewed from the direction of the arrow B in FIG. 8.

In the other embodiment, the belt 523 has the shape of a rope having ends. The engagement portion 54 is provided at both ends in the direction of the x-axis with securing portions 546. In the securing portions 546, their respective holes 546A are formed into which ends of the belt 523 are inserted. Inside each hole 546A, a convexo-concave portion 546B is formed in a shape mating with projections 523B provided on the belt 523. Each hole 546A has an opening 546C. Each of both ends of the belt 523 is inserted into one of the securing portions 546 through the opening 546C to mate the convexo-concave portion 546B with the projections 523B inside the hole 546A, so that the engagement portion 54 and the belt 523 are joined together.

Thus, like the structure shown in FIGS. 4 to 6, the control section 100 drives the drive source of the drive section 521 to rotate the belt 523 to travel it in the direction +x during the operation for reading an image of an original document, so that the reading of the image of the original document placed on the original glass plate 161 can be achieved.

Next, a more detailed description will be given of the configurations of the components of the reading device 5 according to the one embodiment with reference to FIGS. 2 and 3.

As shown in FIG. 2, in the reading device 5, the center of mass P of the whole of a reading part consisting of the scanner 50 and the support portion 51 (hereinafter, referred to simply as the center of mass P of the scanner 50 and support portion 51), i.e., the composite centroid of the centroid of the scanner 50 and the centroid of the support portion 51) is positioned at a midpoint between both the contact portions 501, 501 where the scanner 50 is in contact with the original glass plate 161. In other words, the center of mass P of the scanner 50 and support portion 51 is located at the same distance from both the contact portions 501, 501. The guide portion 53 is disposed vertically under the center of mass P of the scanner 50 and support portion 51. Furthermore, the belt 523 of the towing portion 52 is secured to the engagement portion 54 at a point on a vertically extending line passing through the center of mass P.

Therefore, the center of mass P of the scanner 50 and support portion 51, the guide portion 53, and the point where the belt 523 tows the engagement portion 54 lie on the vertical line passing through the center of mass P of the scanner 50 and support portion 51.

In the above structure, the belt 523 of the towing portion 52 may be secured to the support portion 51. However, also in this case, a portion of the belt 523 secured to the support portion 51 lies on the vertical line passing through the center of mass P.

If during reading of the reciprocating scanner 50 the support portion 51 vibrates, the scanner 50 may not be able to accurately read an image, resulting in a degraded quality of the read image. Causes of the vibrations include a force necessary for the towing portion during the reciprocation (towing force), a frictional force on the contact portions in contact with the original glass plate 161 (glass frictional force), and a frictional force on a contact portion between the carriage 50 and the guide portion 53 (guide frictional force).

There is known a technique in which the guide frictional force is reduced by attaching a low-friction factor component to the bottom of the support portion in contact with the guide portion. However, this technique cannot reduce the production of torque around the vertical axis (y-axis).

There is also known another technique in which the guide portion is disposed directly under the centroid of the support portion to reduce the torque around the y-axis and the same position of the support portion in the direction y as the centroid of the support portion is towed to reduce the torque around the longitudinal axis of the scanner (z-axis). However, this technique is still insufficient to reduce the production of torque around the y-axis and not expected to achieve a sufficient vibration suppression effect.

Unlike the above known techniques, in this embodiment, the guide portion 53 and the point where the belt 523 tows the engagement portion 54 are situated according the arrangement based on the concept of the center of mass P of the scanner 50 and support portion 51. Therefore, as compared to general reading devices, this embodiment can more reliably reduce the torque produced around the vertical axis when the scanner 50 is moved in the direction of the x-axis as the predetermined direction by the support portion 51 and the towing portion 52. In addition, since the center of mass P of the scanner 50 and support portion 51 is located at the midpoint between both the contact portions 501, 501, the torque around the axis connecting both the contact portions 501, 501, i.e., the z-axis, can be reduced.

This embodiment can more reliably suppress vibrations produced when the scanner 50 moves toward reading an image of an original document than the general reading devices. Therefore, by the suppression of vibrations, variations in reading of an image of an original document performed by the scanner 50 can be reduced to increase the image reading quality of the scanner 50.

Furthermore, in the reading device 5, it is further preferred that the components should be arranged or configured to satisfy the equation below. Specifically, the reading device 5 is preferably configured to satisfy the following equation:

$$d1/d2 = \mu 2 \cdot N2 / \mu 1 \cdot N1 \qquad \text{(Equation 1)}$$

where $\mu 1$ represents a dynamic coefficient of friction at both the contact portions 501, 501;

N1 represents a total normal force of both the contact portions 501, 501;

$\mu 2$ represents a dynamic coefficient of friction at a contact point PT where the engagement portion 54 and the guide portion 53 are in contact with each other;

N2 represents a total normal force at the contact point PT where the engagement portion 54 and the guide portion 53 are in contact with each other;

d1 represents a vertical distance from the contact portion 501 to a towing position of the towing portion 52 (i.e., the line along which the towing portion 52 travels, or the towing position of the belt 523); and d2 represents a vertical distance from the towing position of the towing portion 52 (i.e., the line along which the towing portion 52 travels, or the towing position of the belt 523) to the contact point PT where the engagement portion 54 and the guide portion 53 are in contact with each other.

With the use of this configuration, when the support portion 51 and the scanner 50 are moved by the towing of the towing portion 52, a torque derived from a frictional force on the contact portions 501, 501 in contact with the original glass plate 161 and a torque derived from a frictional force on the contact point PT formed of a line segment on which the engagement portion 54 and the guide portion 53 are in contact with each other are cancelled out each other and no torque derived from the towing force is produced. Thus, the vibrations of the scanner 50 due to the torques around the y-axis and z-axis can be suppressed.

Figure 10:
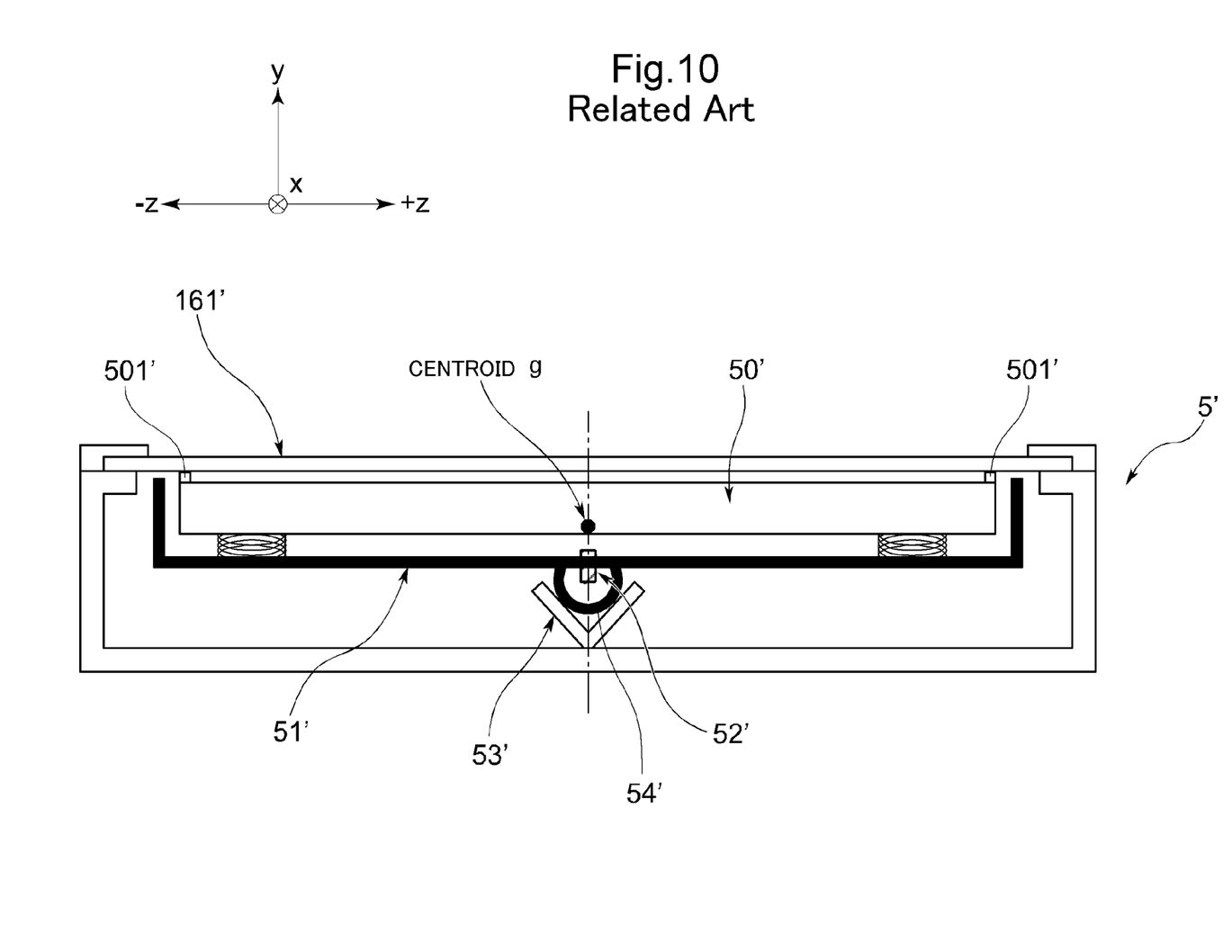
FIG. 10 is a side view showing a schematic structure of a reading device according to a comparative example.
Figure 11:
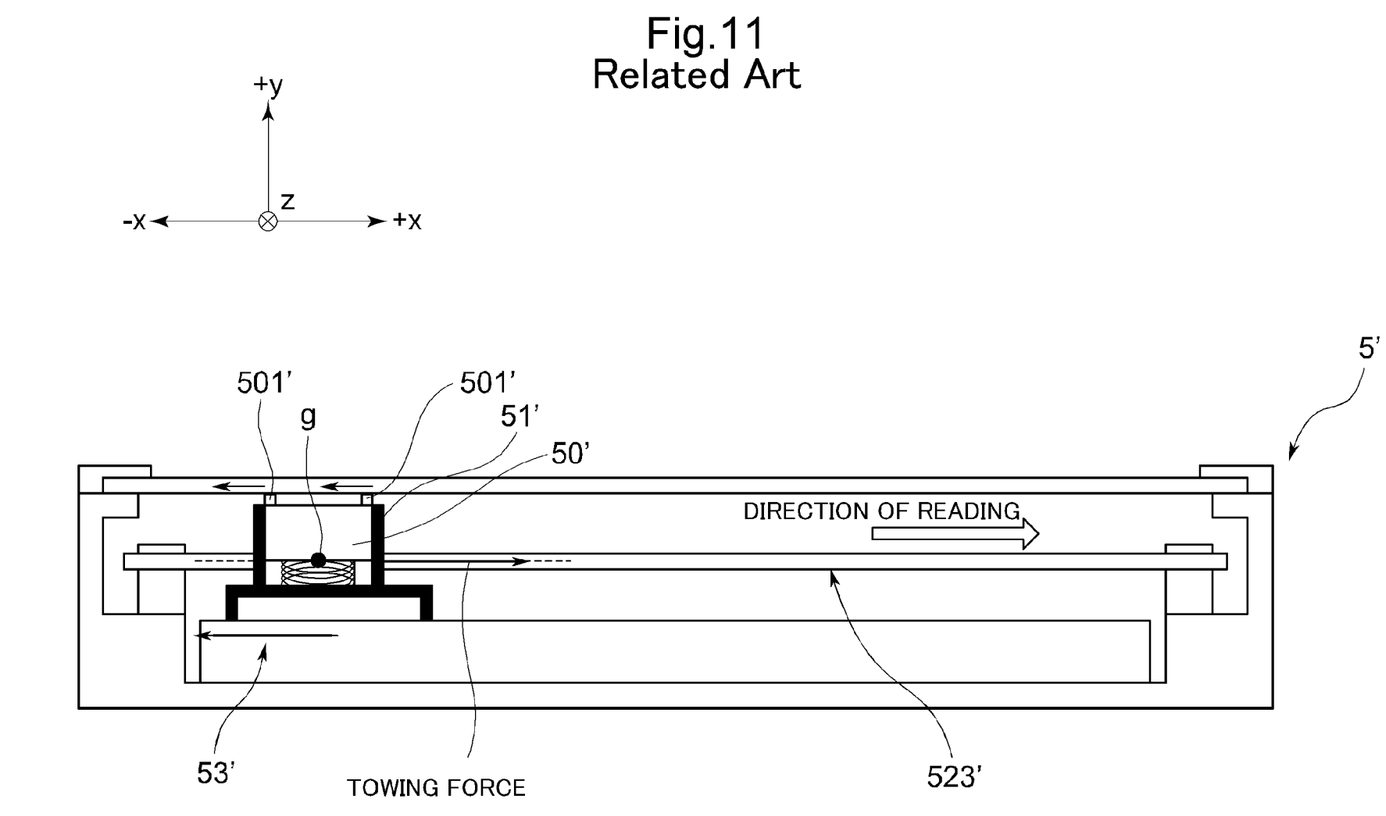
FIG. 11 is a side view showing the schematic structure of the reading device according to the comparative example as viewed from a different direction from in FIG. 10.

Next, a description will be given of comparison on vibrations produced during movement of the scanner between the reading device 5 according to this embodiment and a reading device according to a comparative example. FIG. 10 is a side view showing a schematic structure of the reading device according to the comparative example. FIG. 11 is a side view showing the schematic structure of the reading device according to the comparative example as viewed from a different direction from in FIG. 10.

The reading device 5' according to the comparative example includes a scanner 50', a support portion 51', a towing portion 52', a guide portion 53', an engagement portion 54', and an original glass plate 161'.

As shown in FIG. 10, in the reading device 5', the centroid g of the support portion 51' is positioned at a midpoint between contact portions 501', 501' where the scanner 50' is in contact with the original glass plate 161'. The guide portion 53' is disposed vertically under the center of mass P of the scanner 50' and support portion 51'. Furthermore, the belt 523' of the towing portion 52' is secured to the engagement portion 54' at a point on a vertical line passing through the centroid g. Therefore, the towing portion 52' moves the support portion 51' in a direction along a line passing through the centroid g and extending parallel to the surface of the original glass plate 161'.

As seen from the above, the reading device 5' is configured so that the towing portion 52' tows the support portion 51' at the centroid g of the support portion 51' only and, unlike the reading device 5 according to this embodiment, the guide portion 53', the engagement portion 54', and the towing portion 52' are arranged without being based on the concept of the center of mass of the whole of the reading part consisting of the scanner and the support portion. In addition, the components are arranged regardless of the conditions represented by the aforementioned dynamic coefficients of friction $\mu 1$, $\mu 2$, total normal forces N1, N2, distances d1, d2, and Equation 1.

Figure 12:
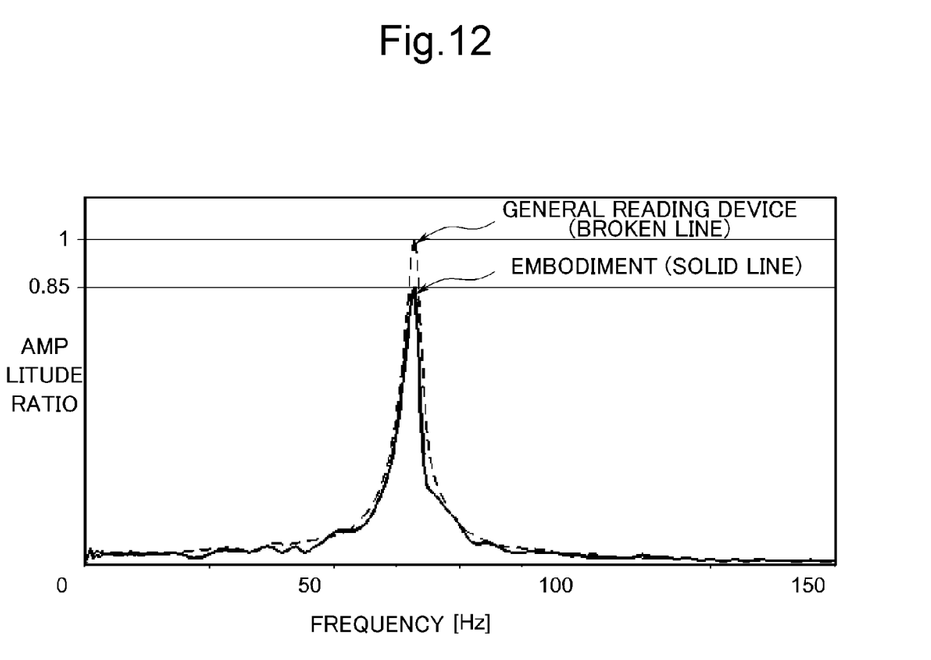
FIG. 12 is a graph showing the results of the FFT analysis of x-directional displacements of respective +z side ends of scanners of the reading device according to the comparative example and the reading device according to the above embodiment when these reading devices were moved in the direction of an x-axis by their respective towing portions.

FIG. 12 is a graph showing the results of the FFT analysis of x-directional displacements of respective +z side (longitudinal) ends of the scanners of the reading device 5' with the above configuration and the reading device 5 according to this embodiment when these reading devices were moved in the predetermined direction, i.e., the direction of the x-axis, by their respective towing portions 52, 52'. The scale of the graph is indicated by amplitude ratio so that the maximum amplitude ratio of the reading device 5' according to the comparative example is 1.

When the reading device 5 according to this embodiment and the reading device 5' according to the comparative example were moved, for experimental measurement, in the predetermined direction x by their respective towing portions under the same conditions except for the aforementioned configurations, the measurement results showed that the maximum amplitude ratio of the reading device 5 according to this embodiment was 0.85.

As can be seen from this, since in the reading device 5 according to this embodiment the components are arranged based on the concept of the center of mass of the scanner 50 and support portion 51, vibrations produced when the scanner moves toward reading an image of an original document can be suppressed more than the reading device according to the comparative example.

The present disclosure is not limited to the configurations of the above embodiment and can be modified in various ways. The structures and processing shown in the above embodiment with reference to FIGS. 1 to 12 are merely illustrative of the present disclosure and the present disclosure is not intended to be limited to the above particular structures and processing.

Various modifications and alterations of this disclosure will be apparent to those skilled in the art without departing from the scope and spirit of this disclosure, and it should be understood that this disclosure is not limited to the illustrative embodiments set forth herein.

What is claimed is:

1. A reading device comprising:
an original glass plate on which an original document to be read is to be placed;
a scanner provided at both ends in a longitudinal direction thereof with contact portions in contact with the original glass plate and configured to read an image of the original document placed on the original glass plate;
a support portion supporting the scanner;
a towing portion configured to tow and move the support portion in a predetermined direction;
a guide portion extending in the predetermined direction and configured to guide a direction of movement of the support portion and the scanner caused by the towing of the towing portion; and
an engagement portion provided on a portion of the support portion facing the guide portion to project toward the guide portion, engaging with the guide portion, and allowing the support portion and the scanner to be moved along the guide portion by the towing of the towing portion, wherein
a center of mass of the scanner and the support portion is positioned at a midpoint between the contact portions provided at both the ends of the scanner,
the guide portion is disposed under the center of mass, and
the towing portion is secured to the support portion or the engagement portion at a point on a vertical line passing through the center of mass.

2. The reading device according to claim 1, wherein the reading device satisfies the following equation:

$$d1/d2 = \mu_2 \cdot N2 / \mu_1 \cdot N1$$

where
$\mu_1$ represents a dynamic coefficient of friction at the contact portions provided at both the longitudinal ends of the scanner,
N1 represents a total normal force of both the contact portions,
$\mu_2$ represents a dynamic coefficient of friction at a contact point where the engagement portion and the guide portion are in contact with each other,
N2 represents a total normal force at the contact point where the engagement portion and the guide portion are in contact with each other,
d1 represents a vertical distance from the contact portion to a towing position of the towing portion, and
d2 represents a vertical distance from the towing position of the towing portion to the contact point where the engagement portion and the guide portion are in contact with each other.

3. The reading device according to claim 1, wherein
the towing portion includes a drive section configured to rotationally drive, a pulley, and a belt mounted over the drive section and the pulley and capable of traveling with the rotational drive of the drive section, and
the belt is secured to the support portion or the engagement portion and configured to move the support portion or the engagement portion in a direction of travel of the belt driven by the drive section.

4. The reading device according to claim 1, wherein the scanner is a CIS scanner.

5. An image forming apparatus comprising:
a reading device; and
an image forming section configured to form an image on a recording medium based on the image read by the reading device, wherein
the reading device comprises:
an original glass plate on which an original document to be read is to be placed;
a scanner provided at both ends in a longitudinal direction thereof with contact portions in contact with the original glass plate and configured to read an image of the original document placed on the original glass plate;
a support portion supporting the scanner;
a towing portion configured to tow and move the support portion in a predetermined direction;
a guide portion extending in the predetermined direction and configured to guide a direction of movement of the support portion and the scanner caused by the towing of the towing portion; and
an engagement portion provided on a portion of the support portion facing the guide portion to project toward the guide portion, engaging with the guide portion, and allowing the support portion and the scanner to be moved along the guide portion by the towing of the towing portion,
a center of mass of the scanner and the support portion is positioned at a midpoint between the contact portions provided at both the ends of the scanner,
the guide portion is disposed under the center of mass, and
the towing portion is secured to the support portion or the engagement portion at a point on a vertical line passing through the center of mass.

* * * * *